(12) United States Patent
Theogaraj et al.

(10) Patent No.: US 12,069,024 B2
(45) Date of Patent: Aug. 20, 2024

(54) SHORT-TERM LEASE ALLOCATION FOR NETWORK ADDRESS CONFLICT REDUCTION IN DHCP FAILOVER DEPLOYMENTS

(71) Applicant: HEWLETT PACKARD ENTERPRISE DEVELOPMENT LP, Houston, TX (US)

(72) Inventors: Isaac Theogaraj, Bangalore (IN); Venkatesan Marichetty, Santa Clara, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/282,911

(22) PCT Filed: Jan. 17, 2019

(86) PCT No.: PCT/US2019/014089
§ 371 (c)(1),
(2) Date: Apr. 5, 2021

(87) PCT Pub. No.: WO2020/149847
PCT Pub. Date: Jul. 23, 2020

(65) Prior Publication Data
US 2021/0400015 A1  Dec. 23, 2021

(51) Int. Cl.
*H04L 61/5053*  (2022.01)
*H04L 61/5014*  (2022.01)
(Continued)

(52) U.S. Cl.
CPC ...... *H04L 61/5053* (2022.05); *H04L 61/5014* (2022.05); *H04L 61/5061* (2022.05); *H04L 61/5076* (2022.05)

(58) Field of Classification Search
CPC ............ H04L 61/2053; H04L 61/2046; H04L 61/2015; H04L 61/2061; H04L 61/2076;
(Continued)

(56) References Cited

U.S. PATENT DOCUMENTS

| 2,013,009 A | * | 9/1935 | Satzinger | ............... B02C 18/36 |
| | | | | 241/82.5 |
| 6,560,642 B1 | * | 5/2003 | Nurmann | .............. H04L 69/169 |
| | | | | 709/224 |

(Continued)

FOREIGN PATENT DOCUMENTS

| CN | 102299932 A | | 12/2011 |
| JP | 2016134749 A | * | 7/2016 |

OTHER PUBLICATIONS

Nokia, Nokia VitalQIP DHCP failover for a secure and stable network, Nov. 23, 2016, https://open-ecosystem.org/assets/nokia-vitalqip-dhcp-failover-secure-and-stable-network (Year: 2016).*

(Continued)

*Primary Examiner* — Dhairya A Patel
*Assistant Examiner* — Vinh Nguyen
(74) *Attorney, Agent, or Firm* — Hewlett Packard Enterprise Patent Department

(57) ABSTRACT

Systems and methods are provided for monitoring a connection state between a primary DHCP server and a secondary DHCP server, determining that a connection between the primary DHCP server and the secondary DHCP server has not been established within a first timeframe, establishing a partner-down operation state at one or more of the primary DHCP server and secondary DHCP server, and, during an established partner-down operation state, issuing/allocating short-term network address leases from one of the primary DHCP servers or secondary DHCP servers. Short- (Continued)

term network leases of the present disclosure may have a duration of between 1 second and 5 minutes.

20 Claims, 5 Drawing Sheets

(51) Int. Cl.
*H04L 61/5061* (2022.01)
*H04L 61/5076* (2022.01)

(58) Field of Classification Search
CPC . H04L 41/0663; H04L 41/0668; H04L 69/40; H04L 67/104; H04L 61/5053; H04L 61/5014; H04L 61/5061; H04L 61/5076; H04L 69/28; H04W 24/08; H04W 24/04
See application file for complete search history.

(56) References Cited

U.S. PATENT DOCUMENTS

| | | | | |
|---|---|---|---|---|
| 6,985,944 | B2* | 1/2006 | Aggarwal | H04L 43/00 709/224 |
| 7,680,876 | B1* | 3/2010 | Cioli | G06F 11/2097 709/201 |
| 7,945,773 | B2* | 5/2011 | Barabash | G06F 11/2041 714/100 |
| 7,953,830 | B2* | 5/2011 | Foster | H04L 41/0816 709/225 |
| 8,195,775 | B2* | 6/2012 | Zhang | H04L 61/5061 370/235 |
| 8,291,111 | B1* | 10/2012 | Kinnear, Jr. | H04L 41/0668 709/239 |
| 8,312,270 | B1* | 11/2012 | Chou | H04L 63/101 713/168 |
| 8,825,904 | B2* | 9/2014 | Leng | H04L 41/0663 709/245 |
| 8,856,384 | B2* | 10/2014 | Jiang | H04L 61/2528 709/219 |
| 8,972,542 | B2* | 3/2015 | Christenson | H04L 41/0668 709/221 |
| 8,984,106 | B2 | 3/2015 | Christenson et al. | |
| 9,277,479 | B2* | 3/2016 | Yokoo | H04B 7/12 |
| 9,344,397 | B2 | 5/2016 | Iyer | |
| 9,621,413 | B1* | 4/2017 | Lee | H04L 41/08 |
| 10,383,146 | B2* | 8/2019 | Agiwal | H04W 74/0816 |
| 10,729,975 | B1* | 8/2020 | Windrem | A63F 13/48 |
| 11,070,945 | B1* | 7/2021 | Gao | G01S 13/003 |
| 11,729,140 | B2* | 8/2023 | Colliaux | H04L 61/5053 709/245 |
| 2003/0105841 | A1* | 6/2003 | Miyake | H04L 61/00 709/220 |
| 2003/0163341 | A1* | 8/2003 | Banerjee | H04L 61/5014 709/230 |
| 2005/0114492 | A1* | 5/2005 | Arberg | H04L 29/1282 709/223 |
| 2005/0271049 | A1* | 12/2005 | Jain | H04L 61/59 370/389 |
| 2008/0205377 | A1* | 8/2008 | Chao | H04L 69/40 370/351 |
| 2010/0054154 | A1* | 3/2010 | Lambert | H04L 61/5084 370/254 |
| 2010/0131660 | A1* | 5/2010 | Dec | H04L 67/1027 709/228 |
| 2011/0085529 | A1* | 4/2011 | Choi | H04W 76/14 370/338 |
| 2011/0296251 | A1* | 12/2011 | Joy | G06F 11/0757 714/47.1 |
| 2012/0231831 | A1* | 9/2012 | Melia | H04L 61/5014 455/517 |
| 2012/0311184 | A1* | 12/2012 | Yamada | H04L 61/2061 709/245 |
| 2013/0080614 | A1 | 3/2013 | Iyer | |
| 2013/0275588 | A1 | 10/2013 | Li et al. | |
| 2014/0006660 | A1* | 1/2014 | Frei | H04L 43/10 710/104 |
| 2014/0068023 | A1 | 3/2014 | Arickan | |
| 2014/0128058 | A1* | 5/2014 | Ji | H04W 24/04 455/423 |
| 2014/0325040 | A1* | 10/2014 | Moore | H04L 41/0672 709/221 |
| 2014/0344475 | A1* | 11/2014 | Chen | H04L 61/2053 709/245 |
| 2015/0095493 | A1* | 4/2015 | Xu | G06F 21/445 709/225 |
| 2015/0143158 | A1* | 5/2015 | Balogh | G06F 11/2007 714/4.11 |
| 2015/0229604 | A1 | 8/2015 | Pal et al. | |
| 2016/0100325 | A1* | 4/2016 | Hain | H04W 24/10 370/241 |
| 2016/0255045 | A1* | 9/2016 | Kolesnik | H04L 12/4641 709/222 |
| 2016/0316402 | A1* | 10/2016 | Shi | H04W 36/165 |
| 2017/0019372 | A1* | 1/2017 | Panje | H04L 65/75 |
| 2017/0099203 | A1* | 4/2017 | Shapur | H04L 67/1034 |
| 2018/0026939 | A1* | 1/2018 | Nagamine | H04L 43/08 709/224 |
| 2018/0041469 | A1* | 2/2018 | Ishikawa | H04L 41/0686 |
| 2018/0176073 | A1* | 6/2018 | Dubey | H04L 69/325 |
| 2018/0286200 | A1* | 10/2018 | Gordon | G08B 29/18 |
| 2019/0238483 | A1* | 8/2019 | Marichetty | H04L 67/104 |
| 2019/0334859 | A1* | 10/2019 | Kannan | H04L 61/5061 |
| 2019/0356541 | A1* | 11/2019 | Finn | H04L 61/5014 |
| 2020/0267050 | A1* | 8/2020 | Katou | H04L 43/08 |
| 2021/0152539 | A1* | 5/2021 | Xie | H04L 63/083 |
| 2021/0271688 | A1* | 9/2021 | Allen | G06F 15/17325 |

OTHER PUBLICATIONS

Lin et al., Summary of High-Availability DHCP Service Solutions, 2011, IEEE, 4th IEEE International Conference on Broadband Network and Multimedia Technology (Year: 2011).*

Risk, V., "High Availability in Kea 1.4.0—Design," retrieved on Oct. 31, 2018 at http://www.gitlab.isc.org/isc-projects/kea/wikis/designs/High-Availability-Design.

Sasidharan, R., "Notes on Server 2012 DHCP Failover," Oct. 1, 2017, https://rakhesh.com/windows/notes-on-server-2012-dhcp-failover/.

Shautsou, A., "Managing Failover Associations," Infoblox, Chapter 30 DHCP Failover, Jun. 28, 2017, https://docs.infoblox.com/display/NAG8/Managing+Failover+Associations.

Droms et al., "DHCP Failover Protocol", Network Working Group, Mar. 2003, 133 pages.

Goldlust et al., "A Basic Guide to Configuring DHCP Failover", available online at <https://kb.isc.org/article/AA-00502/0/A-Basic-Guide-to-Configuring-DHCP-Failover.html>, Jan. 15, 2019, 3 pages.

Hewlett Packard Enterprise Development LP, "Aruba SD—Branch Overview," Sep. 2018, White Paper, <https://web.archive.org/web/20191014150809/https://www.arubanetworks.com/assets/wp/WP_SDBranchOverview.pdf>, 11 pages.

Hewlett Packard Enterprise Development LP, "Aruba SD—WAN Software and Gateways for the Aruba 7000 and 7200 Series Controllers," Jun. 2018, QuickSpecs, <https://ct.hostdata.com.au/cdn/syndication/feeds/hp-ent/inline-content/N6/2/E/2EEA1A10ED206D8A0A5E1FA72939EEA4D13CA4A8_source.PDF>, 33 pages.

Hewlett Packard Enterprise Development LP, "Aruba SD—WAN: Extend Context to the WAN Edge," 2018, Data Sheet, <https://ct.hostdata.com.au/cdn/syndication/feeds/hp-ent/inline-content/N6/0/1/01E121F178531EDOFF22E74BB8F668D0235DF423_source.PDF>, 9 pages.

Kishore Seshadri, "Delivering a Better User Experience Depends on the Context," Jun. 19, 2018, Airheads Community, Blog, <https://community.arubanetworks.com/browse/articles/blogviewer?blogkey=b27d5114-a9e7-4517-8cf0-1ad7979dd5ca>, 4 pages.

Partha Narasimhan, "A Software-Defined Branch Blends Simplicity with Performance," Jun. 19, 2018, Airheads Community, Blog,

(56) References Cited

OTHER PUBLICATIONS

<https://community.arubanetworks.com/browse/articles/blogviewer?blogkey=f4641277-3dc7-4609-9866-3c856076f180>, 4 pages.

* cited by examiner

SHORT-TERM LEASE ALLOCATION FOR NETWORK ADDRESS CONFLICT REDUCTION IN DHCP FAILOVER DEPLOYMENTS

DESCRIPTION OF RELATED ART

The Dynamic Host Configuration Protocol (DHCP) is a client-server network protocol that enables designated servers to lease network addresses (e.g., IP addresses) to clients from a pool of network addresses associated with the given network. In an attempt to ensure that DHCP leases could be issued within a network even when one DHCP server was down, a DHCP failover mechanism was developed to allow two DHCP servers—a primary server and a secondary server (each a "peer," collectively "peers")—to manage the same pool of addresses and ultimately share the load of assigning leases for that pool and provide backup for each other in case of network outages. Because peer DHCP servers draw from the same pool of network addresses, they attempt to coordinate with one another so that they do not create a conflict within the network by issuing the same network address to two different DHCP clients. Conventional systems fail to do this effectively.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
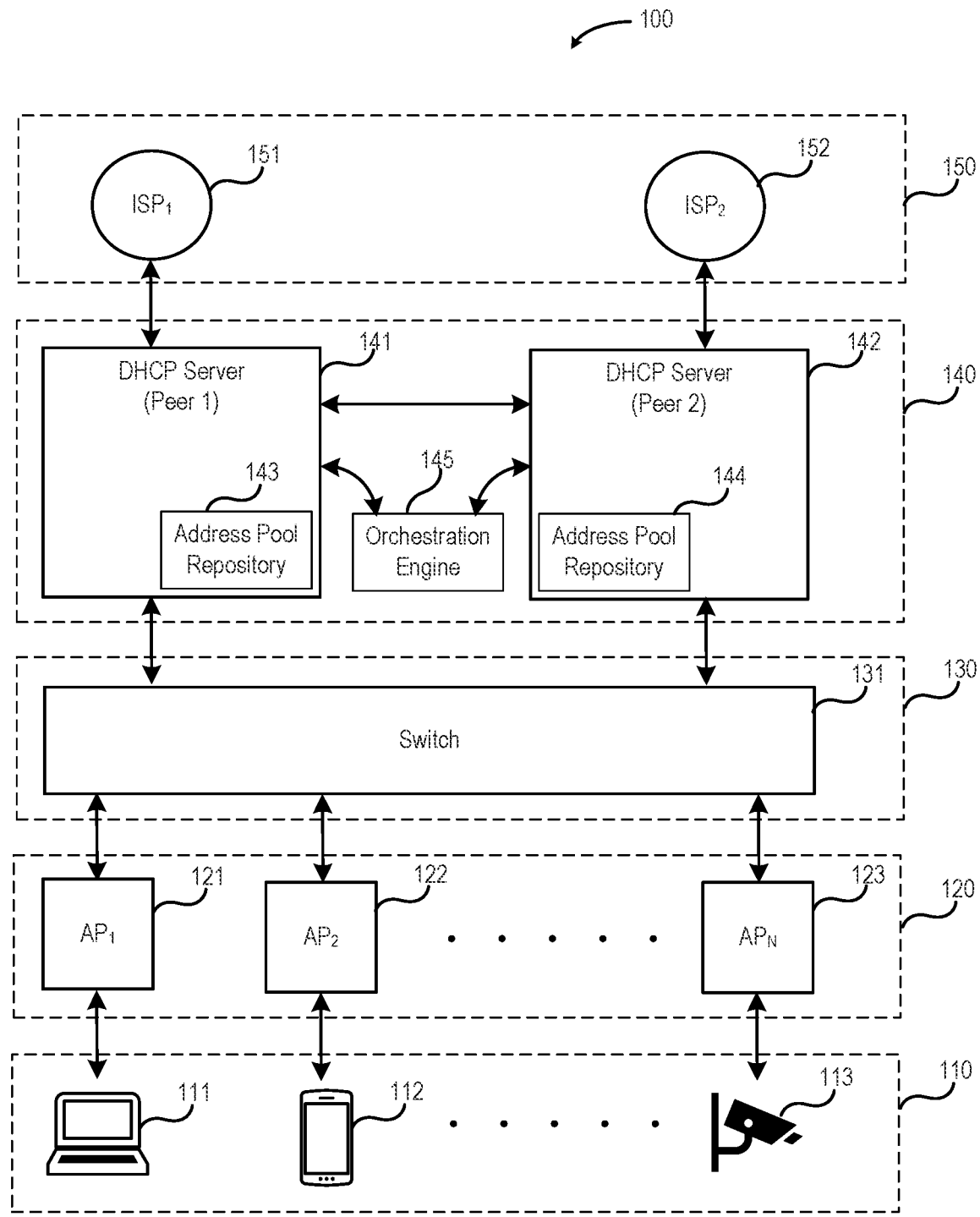
FIG. 1 illustrates an example architecture of a system configured with intelligent lease allocation in accordance with one or more embodiments of the present disclosure.

The figures are not exhaustive and do not limit the present disclosure to the precise form disclosed.

DETAILED DESCRIPTION

To enable highly available DHCP leasing while at the same time reducing network address conflicts—in scenarios where communication between DHCP server peers may be undermined—the technology of the present disclosure introduces intelligent lease allocation mechanisms and methods for providing the same. In some embodiments, the systems and methods of the present disclosure provide an orchestration engine that identifies conditions and connectivity among DHCP server peers, initiates a status-timer with respect to individual DHCP peers (the status-timers configurable to clock a designated first timeframe), then determines a state of individual DHCP server peers based on changes to the conditions and/or connectivity status that occur within the first timeframe, and establishes an operation mode for individual DHCP peers based on the state. An example architecture is shown and described with respect to FIG. 1. Before discussing FIG. 1 in detail, however, a brief discussion of DHCP is provided.

DHCP is a client-server network protocol that enables designated servers to lease network addresses (e.g., IP addresses) to clients from a pool of network addresses associated with the given network. The DHCP servers allocate temporary or permanent network addresses (e.g., IP addresses) to DHCP clients. The basic mechanism for the allocation of these network addresses is fairly straightforward: a DHCP client requests the use of a network address (in some instances for a specified period of time), a DHCP server (or collection of DHCP servers) services the request by identifying an available network address and offering to allocate the network address to the DHCP client for a fixed lease period. As used herein, the period of time for which a network address is allocated to a DHCP client is referred to as a "lease."

In greater detail, a DHCP client broadcasts a discovery message (e.g., broadcasting a DHCPDISCOVER message on the DHCP client's local physical subnet) that signals to available DHCP servers that the DHCP client is attempting to initialize and needs to be provisioned with a network address and/or other configuration parameters. One or more relay agents (e.g., BOOTP relay agents) may facilitate the passing of the discovery message on to one or more of the collection of designated DHCP servers. One or more of the DHCP servers may respond with an offer message that includes an available network address and/or other configuration parameters (e.g., responding with a DHCPOFFER message that includes one of the available network addresses from the pool, the expiration time for the DHCP client's lease, etc.). The DHCP server may transmit the offer message (e.g., a DHCPOFFER message) to the DHCP client using the relay agent (e.g., the BOOTP relay agent). In general, when allocating a new address, DHCP servers may check that the offered network address is not already in use (e.g., the server may probe the offered address with an ICMP Echo Request).

A DHCP client may receive one or more such offer messages (e.g., a DHCPOFFER message) from one or more DHCP servers, or it may not receive any such messages in the case where no DHCP servers are available to lease network addresses. The DHCP client may choose, or be required, to wait for one or more responsive offer messages from DHCP servers. In some instances, the DHCP client may choose one DHCP server among many from which to receive a network address and/or configuration parameters, which in some implementations may be based on the configuration parameters offered in the offer messages. In other instances, DHCP server resources may be more limited such that the DHCP client takes the first network address offer it receives, often after waiting for a period of time. In cases where the DCHP client does not receive an offer message for a certain period of time, the DHCP client's original discovery message may time out (or otherwise expire), and the DHCP client may thus need to retransmit the discover message. In either case, upon receiving an acceptable offer, the DHCP client broadcasts a request message (e.g., a DHCPREQUEST message) that comprises a request to receive the network address and/or other configuration parameters offered by one of the DHCP servers. Such request messages include an indication of the particular DHCP server whose offer the DHCP client would like to accept. In some instances, the DHCP client's request message may specify other options for desired configuration values. Again, the messages passed between the DHCP servers and DHCP clients is accomplished via one or more relay agents (e.g., DHCP/BOOTP relay agents).

DHCP servers receive request messages from DHCP clients (e.g., receiving the DHCPREQUEST broadcasts from the requesting DHCP clients). Those DHCP servers not selected by the request message may use the request message as notification that the DHCP client has declined that DHCP server's offer as detailed in the DHCP server's offer message. The DHCP server selected in the request message, however, stores the binding for the DHCP client and responds to the requesting DHCP client with a provisioning message (e.g., a DHCPACK message) containing the network address and/or other configuration parameters. Ideally, the network address and/or other configuration parameters in the provisioning message should not create a conflict with other provisioning messages offered by the DHCP server itself (or a peer), or be inconsistent with the network address and/or other configuration parameters already detailed in the earlier offer message to which the DHCP client is responding.

The DHCP client receives the provisioning message with the network address and/or other configuration parameters, and adopts the same. At this point, the DHCP client is configured. In some instances, before adopting the network address and/or other configuration parameters, the DHCP client may perform a check on the network address and/or other configuration parameters (e.g., ARP for allocated network address), and may determine the duration of the lease specified in the provisioning message. If the DHCP client detects that the network address is already in use, for example, the DHCP client may send a declination message (e.g., a DHCPDECLINE message) to the server and restart the configuration process.

In the event that, in response to its request message, the DHCP client does not receive either a provisioning message or a rescinding message (e.g., a DHCPNAK message) indicating the DCHP server cannot provision the offered parameters, the DHCP client may time out and retransmit its request message (e.g., the DHCPREQUEST message). The DHCP client may retransmit the request message several times to increase the likelihood contacting the DHCP server. For example, a DHCP client might retransmit its message four times, for a total delay of 60 seconds, before restarting the initialization procedure. If the DHCP client receives neither a provisioning message or a rescinding message after employing a retransmission routine, the DHCP client reverts to an initialization state and restarts the initialization process over again. Unfortunately, this retransmission loop and re-initialization often causes the DHCP client (and the user of that DHCP client) to wait for an undesirable or intolerable amount of time, wherein the user attempting to connect ultimately gives up.

In an attempt to avoid such undesirable wait times and to make DHCP leasing and configuration highly available to requesting DHCP clients, a DHCP failover protocol may be implemented such that DHCP clients may be serviced even when one DHCP server is down. In particular, a DHCP failover mechanism may be implemented such that two DHCP servers—a primary server and a secondary server (each a "peer," and together "peers")—may work together to manage the same pool of addresses and ultimately share the load of assigning leases for that pool and provide backup for each other in case of network outages. Because these peer DHCP servers draw from the same pool of network addresses (i.e., they share the same scope of network addresses), peer DHCP servers attempt to coordinate with one another so that they do not create a conflict within the network by issuing the same network address to two or more different DHCP clients.

Even still, there are many real-world scenarios where conventional DHCP failover mechanisms do not effectively manage peer DHCP server operations to efficiently service clients on the network so that DHCP address leasing is both highly available (e.g., little-to-no wait time) while still avoiding network address conflicts (e.g., duplicate network addresses being leased to different clients on the network during the same timeframe).

One such scenario may occur when one of the peer DHCP servers is provisioned before the other, or one of the peer DHCP servers is otherwise down—i.e., unavailable to issue DHCP leases on its own. In this scenario, current systems often require that a system administrator intervene and manually notify the first DHCP server (i.e., the active peer) that the second DHCP server (i.e., the inactive peer) is down, and that the first DHCP server should issue leases from the full range of addresses in the pool. Moreover, the first DHCP server may not have a complete view of all the addresses previously issued by the second DHCP server before it went down (e.g., the most recently issued addresses that are still on lease), and thus may begin issuing addresses that are in conflict with addresses previously issued by the second DHCP server but not known to the first DHCP server.

Another such scenario may occur when both DHCP server peers are provisioned simultaneously (or near simultaneously) from a central controller (e.g. the Aruba Cloud Provisioning Platform), and, for a time, begin issuing network addresses from the same pool without knowledge which addresses the other peer is issuing. Similar to the first example scenario, the first and second DHCP server peers may issue, for a time, the same addresses to different clients.

Referring now to the figures, FIG. 1 illustrates an example system architecture providing intelligent lease allocation in accordance with one or more embodiments of the present disclosure. As shown, DHCP clients 110 may communicate through access points 120 (e.g., campus AP and/or instant AP based deployments) to pass and receive messages to DHCP servers 140 through network switch 130. DHCP servers 141, 142 communicate with the internet service providers 150 (e.g., ISP 151, ISP 152) through which the DHCP clients are attempting to establish a connection to communicate over the Internet. In the example architecture shown, two DHCP servers 141, 142 may operate in accordance with a DHCP failover protocol enhanced by an orchestration engine 145. The DHCP servers be connected through a switch 130 (e.g., layer 2 switch 131), and may each maintain a copy of the network addresses within the designated scope of network addresses (i.e., the pool) from which the DHCP servers can issue leases, and an indication of known lease statuses of such network addresses. The pool of addresses may be maintained in address pool repositories 143, 144.

The connections between elements shown in FIG. 1 may be wired or wireless, and leverage any communications protocol desired for the given network. Moreover, though not shown explicitly in FIG. 1, DHCP server peers may be provisioned by a distinct platform provided by a network services provider. For example, the DHCP server peers may be provisioned initially through connection to the Aruba Cloud Provisioning Platform offered Hewlett Packard Enterprise's Aruba company. In some examples, the primary DHCP server peer may first connect to such a platform through a DSL based uplink connection; then, the secondary server peer may connect to the platform over a virtual link (e.g., over the first controller's uplink, being MLPS configured for the same). Moreover, in some example environments a primary DHCP server peer may comprise a gateway peer upon which approximately half of the client requests terminate, and a secondary DHCP server peer may be a gateway peer upon which the other approximately half of client requests terminate.

While under ideal conditions both DHCP servers 141, 142 operate in an active-active model, each actively servicing DHCP clients within a branch of a network that are requesting network addresses and/or other configuration parameters. That is, both the primary DHCP server 141 and secondary DHCP server 142 work in concert to issue network address leases to a plurality of DHCP clients from the same address pool in a coordinated that achieves high availability and low chance of conflict. In particular, under ideal conditions the DHCP server peers 141, 142, communicate lease status updates with one another such that the address pool repositories 143, 144 are consistent as between the DHCP servers to avoid conflicts. However, under non-ideal conditions the DHCP server peers may not provide such high availability and may issue network addresses that conflict with one another. Under non-ideal conditions such communication is inhibited and gives rise to potential conflicts. Non-ideal conditions include scenarios where both DHCP server peers are not properly operating in concert with one another, e.g., in scenarios where one of the DHCP server peers is down while the other is operating, in scenarios when both DHCP server peers initiate operation simultaneously and operate in a siloed fashion for a time. Orchestration engine 145 operates to augment the availability and accuracy of network address leases under non-ideal conditions such that lease availability may remain high while at the same time effecting a reduction in network address conflicts. Although Orchestration engine 145 is depicted as a single entity in communication with both DHCP server peers, it will be appreciated that variations may be implemented within the scope of the present disclosure. For example, each DHCP server peer may be equipped with its own orchestration engine 145.

Figure 2:
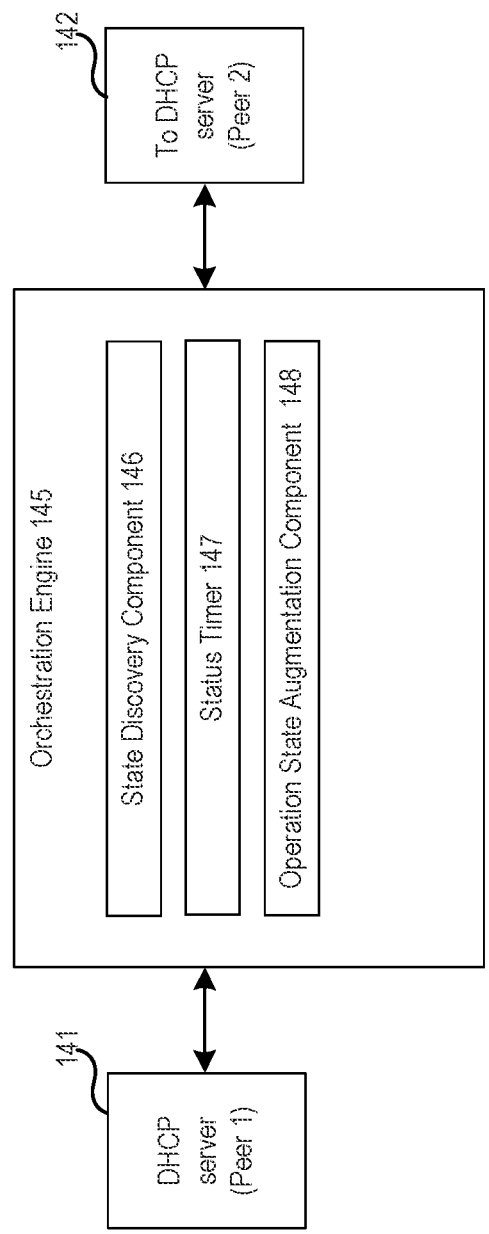
FIG. 2 illustrates various elements of an example orchestration engine in accordance with one or more embodiments of the present disclosure.

FIG. 2 illustrates various elements of an example orchestration engine in accordance with one or more embodiments of the present disclosure. As shown, orchestration engine 145 may include a state discovery component 146, a status timer 147, and an operation state augmentation component 148. Consistent with FIG. 1, orchestration engine 145 is depicted as being in communication with both DHCP server peers 141 and 142. However, as noted with respect to FIG. 1, it will be appreciated that variations may be implemented within the scope of the present disclosure, such as, for example, embodiments where each DHCP server peer may comprise its own orchestration engine 145.

Connectivity discovery component 146 is configured to identify one or more of an operating condition and a connectivity status among DHCP server peers. The operating condition of a DHCP server peer refers to whether the peer is active or inactive—i.e., whether or not the peer is up and running on the network such that it can receive inquiries/requests from DHCP clients and offer/issue network address leases to such DHCP clients. A connectivity status of a DHCP peer refers to whether or not the peer has properly established communication with the other DHCP peer(s) with which it is designated to share an address pool. Where a DHCP server peer is active but has not established the necessary communication connection(s) with the other DHCP server peer (either because the other DHCP server peer is inactive, or the connection between the two has not yet been made), the DHCP server peer may be said to be in a siloed operation state. Where a DHCP server peer is both active and has established communication with the other DHCP server peer, which is also active, the DHCP server peers may both be said to be in a coherent operation state. Finally, where a DHCP server peer is not up and running on the network such that it cannot receive inquiries/requests from DHCP clients and offer/issue network address leases to such DHCP clients, the DHCP server peer may simply be said to be in an inactive state. The connectivity discover component 146 may be configured to operate continuously or periodically within a predefined time period clocked by a status timer such as status timer 147.

Status timer 147 is configured to provide a count of time. In some embodiments the status timer 147 counts down for a predefined time interval, commencing such countdown when triggered. Status timer 147 may be configured to be triggered upon any event desired for the given application. In some embodiments, the status timer 147 is configured to be triggered upon a DHCP server achieving an active status. In some embodiments, the status timer 147 is configured to be triggered upon a DHCP server receiving power. In some embodiments, the status timer 147 is configured to be triggered upon DHCP server boot up. In some embodiments, the status timer 147 is configured to be triggered upon the initiation of DHCP server's connection discovery operations (i.e., when the DHCP server begins probing to find and establish a connection with its peer). Once triggered, the status timer 147 counts down for a predetermined time interval and, once the time interval has elapsed, status timer 147 may provide an indication that the time interval has elapsed or otherwise expired. The predefined time interval may be set (e.g., by a network administrator) to any time desired. In some embodiments, the predefined time interval may be set to about between 3-240 seconds, as desired for a given network. Among other time intervals within the foregoing range, experimental results have shown that setting the predefined time interval to about 60 seconds achieves a desirable balance between high availability of DHCP lease handout and low conflict during non-ideal conditions when implementing the technology disclosed herein.

Operation state augmentation component 149 determines whether, during the predefined time interval, the DHCP server peer has achieved the coherent operation state with its peer (i.e., determining whether or not the DHCP server peer is both active and has established a communication connection with the other DHCP server peer(s) with which it is designated to connect, and which are also determined to be active).

Upon determining that two or more DHCP server peers are operating in a coherent operation state such that they can coordinate in handing out DHCP network address leases to DHCP clients (e.g., branch hosts), operation state augmentation component 149 may effectuate an augmentation operation comprising a load balance operation designed to distribute incoming discovery/request messages among the DHCP clients in accordance with a load balance rule. In some embodiments the load balance rule achieves an even (or near even) distribution of the number of discovery/request messages serviced by each DHCP client. In other embodiments the load balance rule distributes discovery/request messages among the DHCP servers' respective computing capacities (in real-time or as specified) and/or known resources. For instance, if the DHCP lease processing capacity of a primary DHCP server peer is 20% greater (in a given timeframe) than that of the secondary DHCP server peer, then, upon determining that the peers are in a coherent operation state, the operation state augmentation component 149 may distribute incoming discovery/request messages from DHCP clients such that 20% more are handled by the primary DHCP server peer than the secondary DHCP server peer. The operation state augmentation component 149 may be configured to effectuate any load balancing operation to augment lease handling by respective DHCP server peers in accordance with the technology of the present disclosure.

Upon determining that a DHCP server peer did not achieve a coherent operation state during the predefined time interval, and that instead it is operating in a siloed operation state (such that it cannot yet coordinate the other DHCP server peer in handing out DHCP network address leases to DHCP clients), operation state augmentation component 149 may then effectuate an augmentation operation comprising a partner-down operation designed to put the siloed DHCP server peer into a "partner-down" state wherein it may then begin issuing network address leases from the address pool repository on a short-term basis. That is, the DHCP server peer operating in the "partner down" state may, until achieving a coherent operation state with its peer, commence with issuing short-term leases (between 1 second and 5 minutes, as may be designated by a network administrator) so that the network can handle network address requests from DHCP clients with high availability, but also reduce the probability and consequence of leasing a network address that is in conflict with a network address leased by the other DHCP server peer with which a connection has not yet been established. Results have shown that issuing short-term leases of about 10 seconds with the present technology achieves a network address leasing environment that can be completely (or nearly completely) conflict-free while being highly available to DHCP clients needing new network addresses.

As is well known in the art, default DHCP leases are issued for time periods of 12 hours or longer. If two siloed DHCP servers issue the same network address to two different DHCP clients for such a timeframe, for example, the consequences associated with this conflict are long-lasting. However, with the orchestration features of the present disclosure, DHCP server peers can continue to hand out limited network address leases while disconnected with one another (or while one DHCP server peer is down), thereby maintaining high availability while reducing conflicts and conflict repercussions. With the technology of the present disclosure, however, issuing short-term leases of 5 minutes or less in non-ideal scenarios (e.g., when two DHCP server peers are operating in siloed operation states) ensures that, in the worst case, a network address conflict can only last between 1 second and 5 minutes.

Though network address conflicts has been a longstanding issue within DHCP and other Internet based communication environments, those of ordinary skill in the art have traditionally perceived such conflicts to be the necessary price to be paid in exchange for making DHCP leases highly available to clients—e.g. providing prompt allocation of leases in response to client requests despite the looming risk of conflicting network addresses. Persons of ordinary skill in the art would not have thought to build the orchestration technology disclosed herein on top of the DHCP protocol because offering short-term leases to facilitate such orchestration would have been thought to be not very useful for end users, and would impose too great a computational burden on the network to issue repeated short-term leases to make a DHCP client's communications experience virtually seamless. That is, in situations where DCHP clients request an IP address, for example, they generally intend to engage in internet communications for longer than a timeframe that is less than 5 minutes, and certainly longer than 10 seconds. Thus, persons of ordinary skill in the art would not have thought to implement the orchestration technologies of the present disclosure because they could increase the computational burden on the DHCP servers and DHCP clients in the network.

However, results observed demonstrate that the orchestration features presented herein can indeed be supported in practical environments where non-ideal scenarios are faced. For example, the present technology may be implemented in networking environments where two or more Aruba 70XX and/or Aruba 72XX controllers, for example, are deployed as gateway peers servicing one or more branches of a network (e.g., a SD-WAN). Such high capacity controllers can operate as DHCP servers that implement DHCP failover protocols enhanced by the orchestration features of the present disclosure.

Referring still to FIG. 2, in addition to the aforementioned short-term leasing features, the operation state augmentation component 149 may be configured to effectuate active synchronization among the address pool repositories stored at each DHCP server peer. Active synchronization involves running a synchronization operation either (i) periodically in accordance with a predefined interval, or (ii) upon determining that a DHCP server peer has reached a synchronization warranting condition. A synchronization warranting condition may include any condition set by a network administrator. By way of a few nonlimiting examples, a synchronization warranting condition may be satisfied when a DHCP server peer issues a predetermined number of leases (e.g., five network address leases, 10 network address leases, etc.), a predetermined number of leases previously handed out by the given DHCP server peer have expired or are otherwise available for reuse, a DHCP server peer begins to experience issues indicative of an impending failure or reduction in processing capacity, a DHCP server peer has made a predetermined number of offers that have remained outstanding for longer than a predetermined period of time, etc. Either DHCP server peer (e.g., the primary or secondary DHCP server peer) may initiate an active synchronization operation.

By operation of the orchestration engine as noted herein (e.g., leveraging unique, short-term lease allocation routines during "Partner-Down" states, and/or providing active synchronization among DHCP server peers, etc.), the technology of the present disclosure can help avoid starvation of branch DHCP clients in obtaining a valid DHCP based network address (e.g., IP addresses), while at the same time reducing the occurrence and consequences of conflicts.

Figure 3:
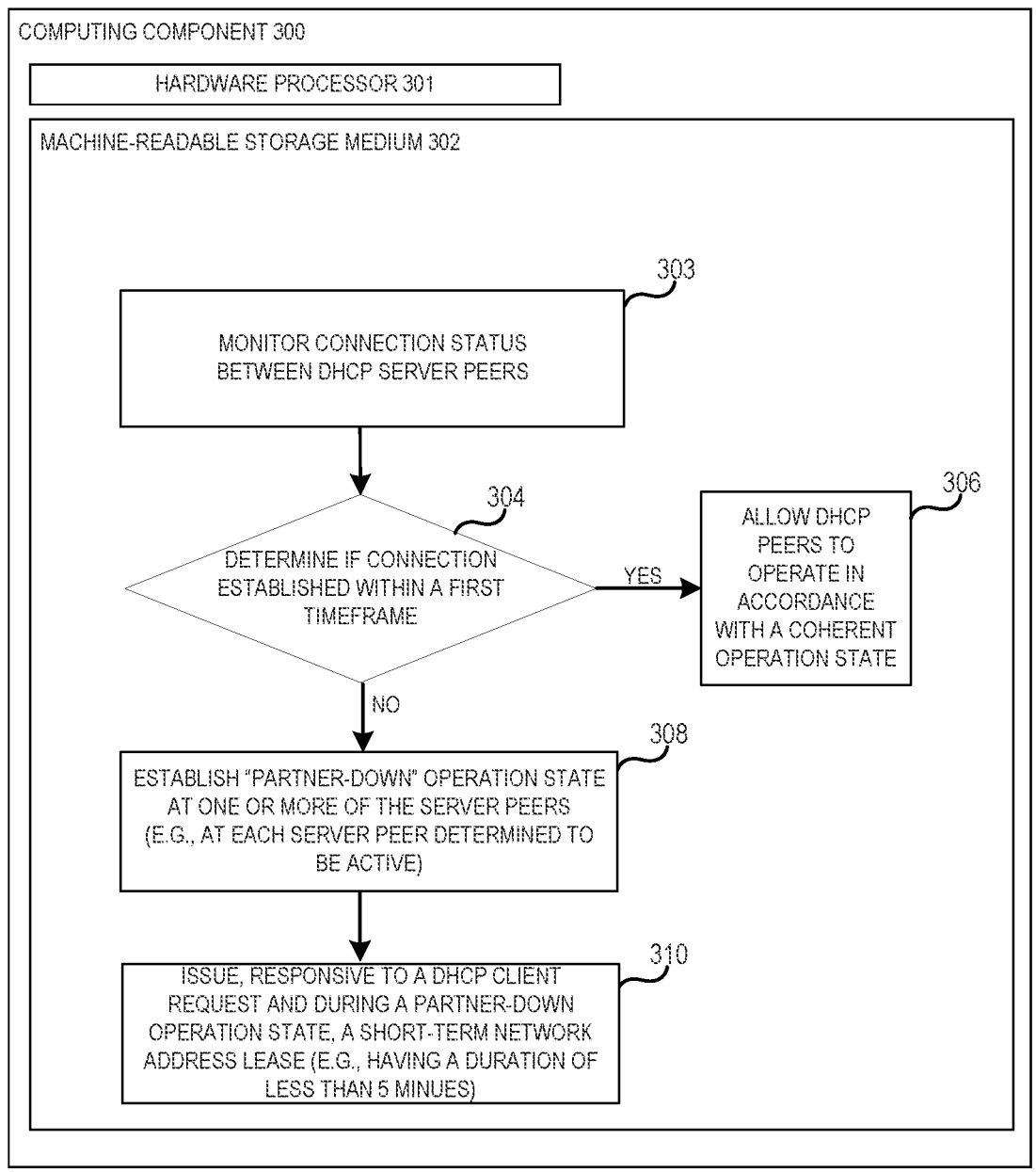
FIG. 3 is an operational flow diagram detailing an example method that may be implemented in accordance with one or more embodiments of the present disclosure.

FIG. 3 illustrates an example computing component 300 for orchestrating DHCP lease handouts in accordance with embodiments of the present disclosure. Computing component 300 may be embodied, in whole or in part, in a DHCP peer, in orchestration engine 145, or in any other element of system 100. Computing component 300 may include a hardware processor 301 and a machine-readable storage medium 302. Computing component 300 may be, for example, a server computer, a controller, or any other similar computing component capable of processing data. Hardware processor 301 may be one or more central processing units (CPUs), semiconductor-based microprocessors, and/or other hardware devices suitable for retrieval and execution of instructions stored in machine-readable storage medium, 302. Hardware processor 301 may fetch, decode, and execute instructions, such as instructions to effectuate 303-

310, to orchestrate DHCP leasing in accordance with one or more embodiment of the present disclosure (e.g., to issue short term leases in scenarios where reduction of occurrence and consequence of DHCP lease conflicts is desired).

A machine-readable storage medium, such as machine-readable storage medium 302, may be any electronic, magnetic, optical, or other physical storage device that contains or stores executable instructions. Thus, machine-readable storage medium 302 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 302 may be a non-transitory storage medium, where the term "non-transitory" does not encompass transitory propagating signals. As described in detail below, machine-readable storage medium 302 may be encoded with executable instructions, for example, instructions 303-310, to orchestrate DHCP leasing in accordance with one or more embodiment of the present disclosure (e.g., to issue short term leases in scenarios where reduction of occurrence and consequence of DHCP lease conflicts is desired).

Computing component 300 may embody, or may be embodied within, one or more DHCP server peers 141, 142 (FIG. 1), or may embody or be embodied within another element of system 100 (FIG. 1) that is distinct from either DHCP server peer, but which is in communication with one or more of such DHCP server peers in order to effectuate the functionality of orchestrator 145. For example, as shown in FIG. 3, hardware processor 301 may execute instruction 303 in order to monitor a connection state between server peers (e.g., between a designated primary DHCP server and a designated secondary DHCP server). Further, hardware processor 301 may execute instruction 304 in order to determine if the necessary communication connections have been established between server peers within a first timeframe (e.g., a timeframe dictated by an embedded timer).

If, pursuant to instruction 304, operations of hardware processor 301 determines, based on the monitoring, that a connection between server peers (e.g., a primary DHCP server and a secondary DHCP server) has been established within a first timeframe, hardware processor 301 may execute instruction 306 in order to permit the server peers to operate in accordance with a coherent operation state (e.g., issuing default duration leases in accordance with regular operation).

If, on the other hand, pursuant to operation 304, operations of hardware processor 301 determine that a connection between server peers (e.g., a primary DHCP server and a secondary DHCP server) has not been established within a first timeframe, hardware processor 301 may execute instruction 308 in order to establish, based on the determination, a partner-down operation state at one or more of the server peers (e.g., at one or more of the primary DHCP server and secondary DHCP server). In some embodiments, the partner-down operation state may be established only at those server peers determined to be active (i.e., able to issue leases).

Hardware processor 301 may execute instruction 310 in order to issue, responsive to a client request (e.g., a DHCP client request) and during an established partner-down operation state, a short-term network address lease from one of the server peers (e.g. from one of the primary DHCP server or secondary DHCP server), where the short-term network address lease is a network address lease with a duration of between 1 second and 5 minutes.

Figure 4:
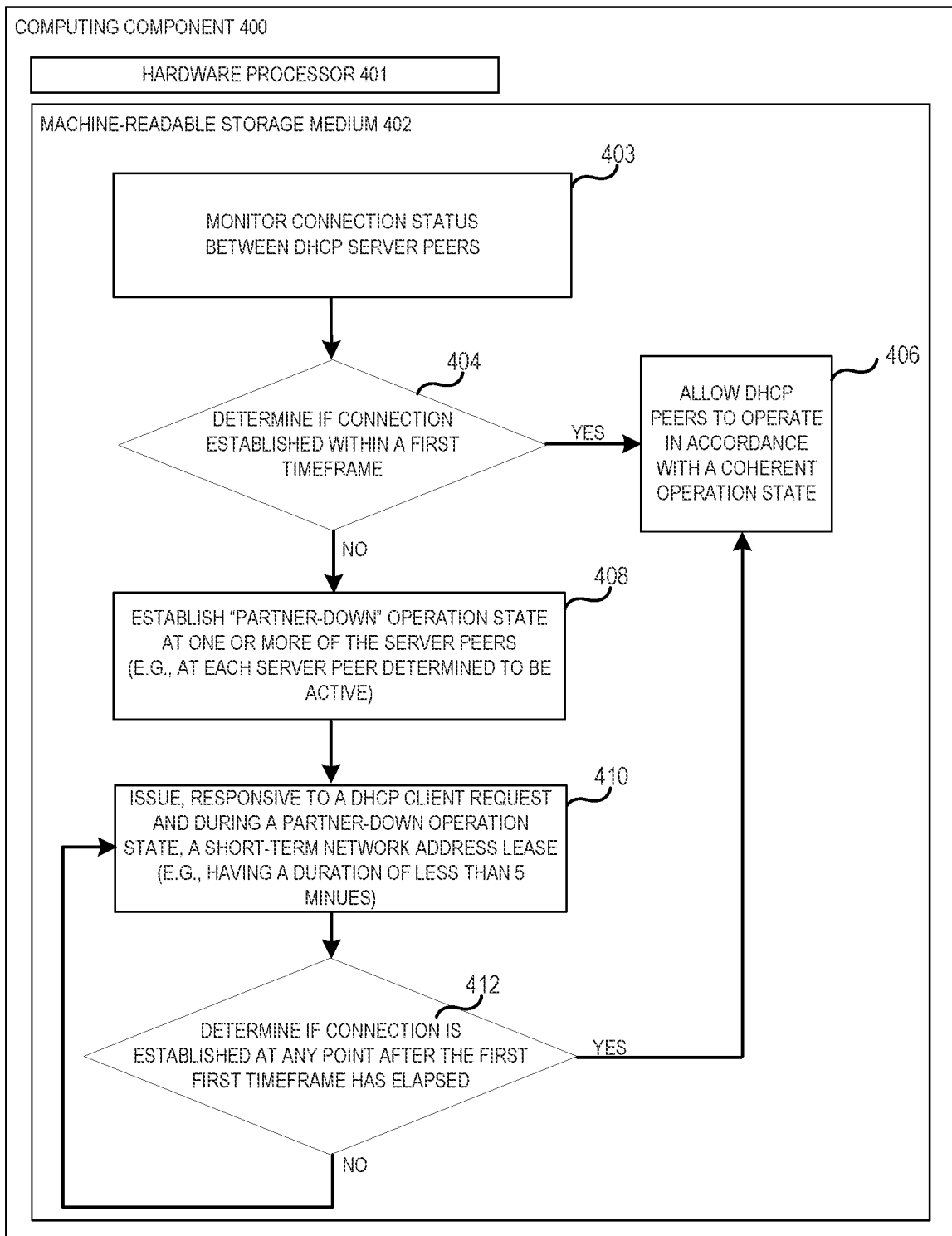
FIG. 4 is an operational flow diagram detailing another example method that may be implemented in accordance with one or more embodiments of the present disclosure.

FIG. 4 is an operational flow diagram detailing another example method that builds on the method described with respect to FIG. 3, and which may be implemented in accordance with one or more embodiments of the present disclosure.

In particular, FIG. 4 illustrates an example computing component 400 for orchestrating DHCP lease handouts in accordance with embodiments of the present disclosure. Computing component 400 may be embodied, in whole or in part, in a DHCP peer, in orchestration engine 145, or in any other element of system 100. Computing component 400 may include a hardware processor 401 and a machine-readable storage medium 402. Computing component 400 may be, for example, a server computer, a controller, or any other similar computing component capable of processing data. Hardware processor 401 may be one or more central processing units (CPUs), semiconductor-based microprocessors, and/or other hardware devices suitable for retrieval and execution of instructions stored in machine-readable storage medium, 402. Hardware processor 401 may fetch, decode, and execute instructions, such as instructions to effectuate 403-412, to orchestrate DHCP leasing in accordance with one or more embodiment of the present disclosure (e.g., to issue short-term leases in scenarios where reduction of occurrence and consequence of DHCP lease conflicts is desired).

A machine-readable storage medium, such as machine-readable storage medium 402, may be any electronic, magnetic, optical, or other physical storage device that contains or stores executable instructions. Thus, machine-readable storage medium 402 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 402 may be a non-transitory storage medium, where the term "non-transitory" does not encompass transitory propagating signals. As described in detail below, machine-readable storage medium 402 may be encoded with executable instructions, for example, instructions 403-412, to orchestrate DHCP leasing in accordance with one or more embodiment of the present disclosure (e.g., to issue short term leases in scenarios where reduction of occurrence and consequence of DHCP lease conflicts is desired).

Similar to component 300 (FIG. 3), computing component 400 may embody, or may be embodied within, one or more DHCP server peers 141, 142 (FIG. 1), or may embody or be embodied within another element of system 100 (FIG. 1) that is distinct from either DHCP server peer, but which is in communication with one or more of such DHCP server peers in order to effectuate the functionality of orchestrator 145. For example, as shown in FIG. 4, hardware processor 401 may execute instruction 403 in order to monitor a connection state between server peers (e.g., between a designated primary DHCP server and a designated secondary DHCP server). Hardware processor 401 may execute instruction 404 in order to determine if the necessary communication connections have been established between server peers within a first timeframe (e.g., a timeframe dictated by an embedded timer).

If, pursuant to instruction 404, operations of hardware processor 401 determine, based on the monitoring, that a connection between server peers (e.g., a primary DHCP server and a secondary DHCP server) has been established within a first timeframe, hardware processor 401 may execute instruction 406 in order to permit the server peers to operate in accordance with a coherent operation state.

If, on the other hand, pursuant to instruction 404, operations of hardware processor 401 determine that a connection between server peers (e.g., a primary DHCP server and a secondary DHCP server) has not been established within a first timeframe, hardware processor 401 may execute instruction 408 in order to establish, based on the determination, a partner-down operation state at one or more of the server peers (e.g., at one or more of the primary DHCP server and secondary DHCP server). In some embodiments, the partner-down operation state may be established only at those server peers determined to be active (i.e., able to issue leases).

Hardware processor 401 may execute instruction 410 in order to issue, responsive to a client request (e.g., a DHCP client request) and during an established partner-down operation state, a short-term network address lease from one of the server peers (e.g. from one of the primary DHCP server or secondary DHCP server), where the short-term network address lease is a network address lease with a duration of between 1 second and 5 minutes.

Hardware processor 401 may execute instruction 412 in order to further monitor the connection status between server peers, and make a determination as to whether a connection between the server peers has been restored or otherwise established at any point after the first timeframe has elapsed. For example, pursuant to instruction 412, the operations of hardware processor 401 determine, based on the monitoring, that a connection between a primary DHCP server and a secondary DHCP server has been established at a point in time after a first timeframe has elapsed.

If, pursuant to instruction 412, operations of hardware processor 401 determine that a connection between server peers (e.g., a primary DHCP server and a secondary DHCP server) has been restored or otherwise established at any point after the first timeframe has elapsed, operations of hardware processor 401 may establish a coherent operation state at the DHCP server peers (e.g., operations of hardware processor 401 may return and execute instruction 406 and permit the server peers to operate in accordance with a coherent operation state).

If, on the other hand, pursuant to instruction 412, operations of hardware processor 401 determine that a connection between server peers (e.g., a primary DHCP server and a secondary DHCP server) still has not been established, operations of hardware processor 401 may maintain the partner-down operation states established at instruction 408, and continue to issue short-term leases consistent instruction 410. Instruction 412 may be executed continuously or at designated intervals as desired within a given network (as may be determined and configured by a network administrator).

Although the foregoing disclosures refer to examples where the present technology is deployed on top of DHCP networking protocols and failover routines in specific architectural environments, it should be appreciated that the technology of the present disclosure can be implemented in any type of network using any type of network address issuing protocol in any topology where two or more peer servers are designed to coordinate with one another to issue time-limited network address leases. It should further be appreciated that the orchestration technology disclosed herein may be implemented as an alternative to or in addition to current DHCP protocol features (including current DHCP failover protocols). That is, the orchestration technology disclosed herein may be implemented as a wrapper, or otherwise as a supplement to already existing DHCP implementations. As such, in many implementations of the present technology, no explicit client configuration is required, and the orchestration technology may operate in the background of the network such that DHCP clients are blind to its functionality and features.

Figure 5:
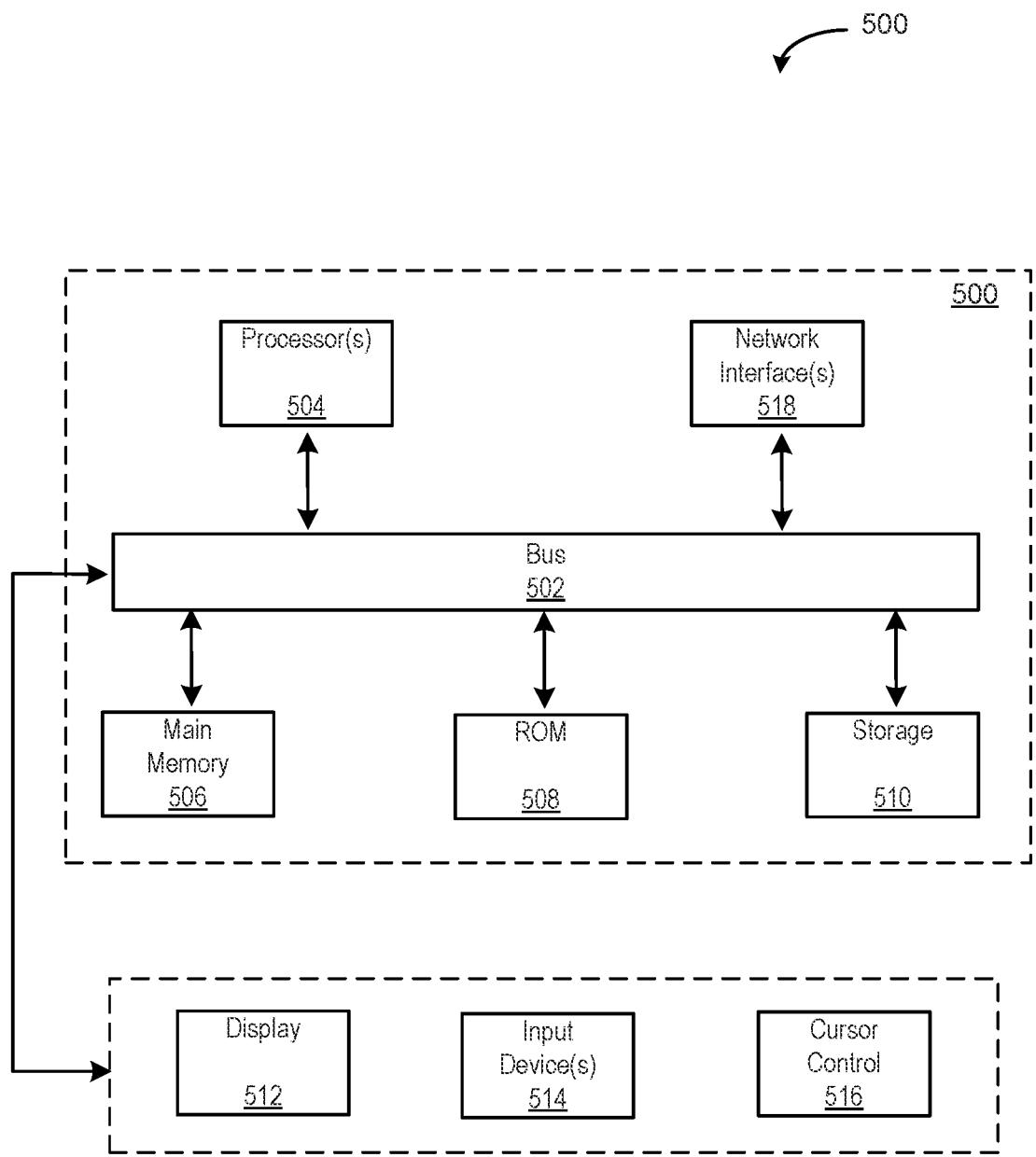
FIG. 5 illustrates a block diagram of an example computer system in which various of the embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    performing, by a network orchestrator, a Dynamic Host Configuration Protocol (DHCP) connection discovery between a primary DHCP server and a secondary DHCP server managing a same pool of network addresses, wherein the network orchestrator is distinct from the primary and secondary DHCP servers, and wherein the DHCP connection discovery comprises:
        determining a connectivity status indicating whether a connection between the primary and secondary DHCP servers has yet been established; and
        initiating a status timer that clocks a first timeframe for establishing the connection;

determining, by the network orchestrator based on the DHCP connection discovery, that the connection between the primary and secondary DHCP servers has not been established yet within the first timeframe, wherein the primary and secondary DHCP servers are provisioned at different times;

establishing, by the network orchestrator based on the connectivity status, a partner-down operation state for at least the primary DHCP server, wherein the partner-down operation state indicates an absence of coordination between the primary and secondary DHCP servers;

configuring, by the network orchestrator responsive to a DHCP client request, the primary DHCP server to issue a short-term network address lease during the established partner-down operation state, wherein the short-term network address lease is a network address lease with a duration within a predefined temporal range associated with the partner-down operation state; and in response to determining, based on the DHCP connection discovery, that the connection between the primary and secondary DHCP servers is established, establishing, by the network orchestrator, a coherent-operation state at the primary DHCP server.

2. The method of claim 1, further comprising:
establishing, by the network orchestrator upon determining that the connection is established based on the DHCP connection discovery, the coherent-operation state at the secondary DHCP server.

3. The method of claim 1, wherein establishing a partner-down operation state for the primary DHCP server further comprises:
determining, by the network orchestrator, an operational status of the primary DHCP server; and
in response to determining the primary DHCP server to be active, establishing, by the network orchestrator, the partner-down operation state for the primary DHCP server.

4. The method of claim 1, wherein the status timer clocking the first timeframe is initiated by the network orchestrator upon being triggered by a triggering event.

5. The method of claim 1, wherein the first timeframe is between 30 seconds and 120 seconds.

6. The method of claim 1, wherein the first timeframe is 60 seconds.

7. The method of claim 1, wherein the predefined temporal range associated with the partner-down operation state indicates that the duration of the short-term network address lease is between 1 second and 5 minutes.

8. A computing system, comprising:
a non-transitory computer-readable storage medium; and
one or more hardware processors programmed to:
operate, on the computing system, a network orchestrator distinct from a primary Dynamic Host Configuration Protocol (DHCP) server and a secondary DHCP server, wherein the primary and secondary DHCP servers manage a same pool of network addresses;
perform a DHCP connection discovery between the primary DHCP server and the secondary DHCP server, wherein the DHCP connection discovery comprises:
determining a connectivity status indicating whether a connection between the primary and secondary DHCP servers has yet been established, wherein the primary and secondary DHCP servers are provisioned at different times; and
initiating a status timer that clocks a first timeframe for establishing the connection;
determine, based on the DHCP connection discovery, that the connection between the primary and secondary DHCP servers has not been established yet within the first timeframe;
establish, based on the connectivity status, a partner-down operation state for at least the primary DHCP server, wherein the partner-down operation state indicates an absence of coordination between the primary and secondary DHCP servers;
configure, responsive to a DHCP client request, the primary DHCP server to issue a short-term network address lease during the established partner-down operation state, wherein the short-term network address lease is a network address lease with a duration within a predefined temporal range associated with the partner-down operation state; and
in response to determining, based on the DHCP connection discovery, that the connection between the primary and secondary DHCP servers is established, establishing a coherent-operation state at the primary DHCP server.

9. The computing system of claim 8, wherein the one or more processors are further programmed to:
establish, upon determining that the connection is established based on the DHCP connection discovery, the coherent-operation state at the secondary DHCP server.

10. The computing system of claim 8, wherein the one or more processors are further programmed to establish the partner-down operation state for the primary DHCP server by:
determining an operational status of the primary DHCP server; and
in response to determining the primary DHCP server to be active, establishing the partner-down operation state for the primary DHCP server.

11. The computing system of claim 8, wherein the status timer clocking the first timeframe is initiated upon being triggered by a triggering event.

12. The computing system of claim 8, wherein the first timeframe is between 30 seconds and 120 seconds.

13. The computing system of claim 8, wherein the first timeframe is 60 seconds.

14. The computing system of claim 8, wherein the predefined temporal range associated with the partner-down operation state indicates that the duration of the short-term network address lease is between 1 second and 5 minutes.

15. A non-transitory computer readable storage medium comprising instructions which, when executed on a computer system, cause the computer system to:
operate, on the computing system, a network orchestrator distinct from a primary Dynamic Host Configuration Protocol (DHCP) server and a secondary DHCP server, wherein the primary and secondary DHCP servers manage a same pool of network addresses;
perform a DHCP connection discovery between the primary DHCP server and the secondary DHCP server, wherein the DHCP connection discovery comprises:
determining a connectivity status indicating whether a connection between the primary and secondary DHCP servers has yet been established; and
initiating a status timer that clocks a first timeframe for establishing the connection;
determine, based on the DHCP connection discovery, that the connection between the primary and secondary DHCP servers has not been established yet within the first timeframe, wherein the primary and secondary DHCP servers are provisioned at different times;

establish, based on the connectivity status, a partner-down operation state for at least the primary DHCP server, wherein the partner-down operation state indicates an absence of synchronization between the primary and secondary DHCP servers;

configure, responsive to a DHCP client request, the primary DHCP server to issue a short-term network address lease during the partner-down operation state, wherein the short-term network address lease is a network address lease with a duration within a predefined temporal range associated with the partner-down operation state.

16. The non-transitory computer-readable storage medium of claim 15, wherein establishing a partner-down operation state for the primary DHCP server further comprises:

determining an operational status of the primary DHCP server; and in response to determining the primary DHCP server to be active, establishing the partner-down operation state for the primary DHCP server.

17. The non-transitory computer-readable storage medium of claim 15, wherein the instructions which, when executed on the computer system, cause the computer system to:

establish, upon determining that the connection is established based on the DHCP connection discovery, the coherent-operation state at the secondary DHCP server.

18. The non-transitory computer-readable storage medium of claim 15, wherein the status timer clocking the first timeframe is initiated upon being triggered by a triggering event.

19. The method of claim 1, wherein the primary and secondary DHCP servers are connected to the network orchestrator over corresponding virtual links.

20. The non-transitory computer-readable storage medium of claim 15, wherein the primary and secondary DHCP servers are connected to the network orchestrator over corresponding virtual links.

* * * * *